No. 887,821. PATENTED MAY 19, 1908.
F. LANG.
HAND TRUCK.
APPLICATION FILED FEB. 1, 1908.

Witnesses:
Arthur E. Zumpe
August Miner

Inventor
Frederick Lang
By his Attorney

UNITED STATES PATENT OFFICE.

FREDERICK LANG, OF NEW YORK, N. Y., ASSIGNOR OF ONE-HALF TO ROBERT HENKE, OF BROOKLYN, NEW YORK, AND ONE-HALF TO ANNA VERMILYEA, OF NEW YORK, N. Y.

AND-TRUCK.

No. 887,821.   Specification of Letters Patent.   Patented May 19, 1908.

Application filed February 1, 1908. Serial No. 413,811.

*To all whom it may concern:*

Be it known that I, FREDERICK LANG, a citizen of the United States, residing at New York city, Manhattan, county and State of New York, have invented new and useful Improvements in Hand-Trucks, of which the following is a specification.

This invention relates to a hand truck provided with improved means for carrying the forward wheeled end thereof over curbs, steps and similar abrupt obstructions.

Figure 1:
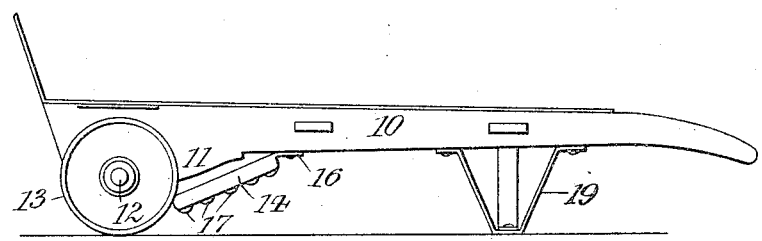
Figure 2:
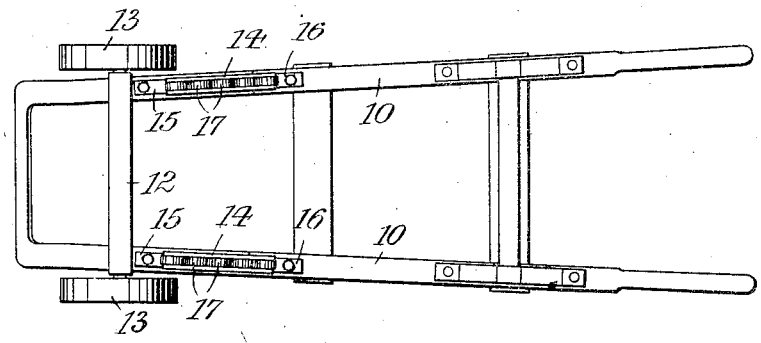
Figure 3:
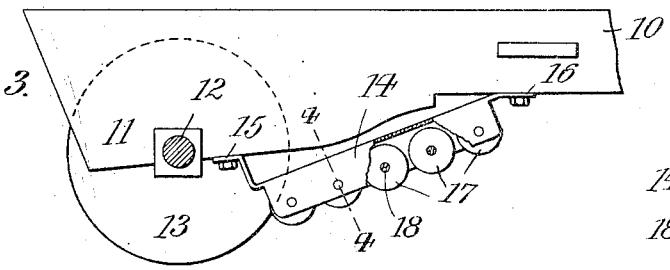
Figure 4:
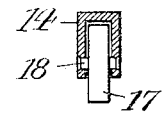

In the accompanying drawing: Figure 1 is a side elevation of my improved hand truck; Fig. 2 a bottom view thereof; Fig. 3 a detail, partly in section, of the front of the truck, and Fig. 4 a cross section on line 4—4, Fig. 3.

The side bars 10 of the truck are extended downwardly in front to form depending cheeks 11 that constitute the bearings for the axle 12 of the traction wheels 13. Each cheek 11 has an inclined rear edge, along which extends a rail 14 inclined upwardly from front to rear. This rail is of inverted U-shape in cross section and is provided with a front lug 15 and a rear lug 16. Of these, lug 15 is attached to cheek 11, sidewise of wheel 13, so that rail 14 is overlapped by such wheel, while lug 16 is attached to the body of bar 10, immediately back of cheek 11.

Within rail 14 are journaled a number of small rollers 17 placed in proximity side by side. These rollers turn on shafts 18 which have their bearings in the cheeks of rail 14, and are so set that a segment of each roller protrudes downwardly from said rail, the treads of all the rollers being laid in a common inclined plane. By the construction described, a continuous inclined roller bearing is formed at the front of each side bar, the forward roller of which is set slightly above the tread of wheel 13, while the rear roller is set slightly below the main body of said side bar.

During the normal operation the truck is propelled on traction wheels 13, the rollers 17 being then entirely out of action. The rollers are also out of action when the truck stands, the rear end of the truck being in that case supported by a foot 19 arranged back of rollers 17 and lifting the latter off the ground. When, however, the truck is to be carried with its traction wheels over a curb, step, or other rise, rollers 17 will consecutively engage the edge of such rise and permit the passage of the forward end of the truck over the same without jolting. In this way the raising and lowering of trucks, especially when loaded, over obstructions is greatly facilitated.

I claim:

1. A hand truck provided with side bars, traction wheels journaled at the front thereof, a plurality of rollers extending rearwardly from the traction wheels in an upwardly inclined direction and a foot back of the rollers, substantially as specified.

2. A hand truck provided with side bars, traction wheels, rails extending rearwardly from the traction wheels in an upwardly inclined direction, and a plurality of rollers journaled in said rails, substantially as specified.

3. A hand truck provided with side bars, traction wheels, rails extending rearwardly from the traction wheels in an upwardly inclined direction and having an inverted U-shaped cross section, and a plurality of rollers journaled in said rails, substantially as specified.

Signed by me at New York city, (Manhattan,) N. Y., this 31st day of January, 1908.

FREDERICK LANG.

Witnesses:
ROBERT HENKE,
FRANK V. BRIESEN.

Correction in Letters Patent No. 887,821.

It is hereby certified that Letters Patent No. 887,821, issued May 19, 1908, upon the application of Frederick Lang, of New York, N. Y., for an improvement in "Hand-Trucks," were erroneously granted to "Robert Henke and Anna Vermilyea," as assignees of the entire interest in said invention, whereas said Letters Patent shoud have been granted to the inventor, *Frederick Lang and Robert Henke and Anna Vermilyea, jointly;* said Robert Henke and Anna Vermilyea being the assignees of one-half and one-fourth interest, respectively, in said patent, as shown by the record of assignments in this office; and that the said Letters Patent should be read with this correction therein that the same may conform to the record of the case in the Patent Office.

Signed and sealed this 2nd day of June, A. D., 1908.

[SEAL.]

C. C. BILLINGS,
*Acting Commissioner of Patents.*